United States Patent [19]
de Vries

[11] 4,179,026
[45] Dec. 18, 1979

[54] BELT CONVEYOR

[75] Inventor: Jacobus de Vries, Krommenie, Netherlands

[73] Assignee: Ammeral Nederland B.V., Wormerveer, Netherlands

[21] Appl. No.: 834,254

[22] Filed: Sep. 14, 1977

[30] Foreign Application Priority Data

Sep. 28, 1976 [NL] Netherlands ................. 7610713
Dec. 8, 1976 [NL] Netherlands ................. 7613616

[51] Int. Cl.² ................................. B65G 23/06
[52] U.S. Cl. ................................. 198/834; 198/831; 198/840; 198/842
[58] Field of Search ............... 198/831, 834, 835, 839, 198/840, 841, 842; 74/230.17 C, 240, 241

[56] References Cited

U.S. PATENT DOCUMENTS

| | | | |
|---|---|---|---|
| 589,627 | 9/1897 | Springer | 198/840 |
| 1,628,436 | 5/1927 | Segrin et al. | 198/840 |
| 2,347,365 | 4/1944 | Paradise | 198/841 |
| 2,413,339 | 12/1946 | Stadelman | 198/835 |
| 2,744,618 | 5/1956 | Seal | 198/834 |
| 2,870,490 | 1/1959 | Freedlander | 74/240 |
| 3,237,754 | 3/1966 | Freitag, Jr. et al. | 198/831 |
| 3,572,496 | 3/1971 | Cutts, Sr. et al. | 198/835 |
| 4,024,949 | 5/1977 | Kleysteuber et al. | 198/831 |
| 4,067,439 | 1/1978 | Janitsch | 198/831 |

FOREIGN PATENT DOCUMENTS

| | | | |
|---|---|---|---|
| 234087 | 3/1960 | Australia | 198/834 |
| 1436037 | 11/1966 | France | 198/842 |
| 1162115 | 8/1969 | United Kingdom | 198/842 |

*Primary Examiner*—Jeffrey V. Nase
*Attorney, Agent, or Firm*—Haseltine, Lake & Waters

[57] ABSTRACT

A belt conveyor comprising an endless conveyor belt driven by a drive and having an upper and a lower part, the conveyor belt being provided near at least one edge with a detaining assembly which engages a guide and which are locked by this guide against displacement in the direction away from the guide. According to the invention the detaining assembly is in engagement with guide discs which are rotatably supported adjacent the conveyor belt and which forms the guide, while the drive engages the detaining assembly and drive the conveyor belt through the detaining assembly.

8 Claims, 6 Drawing Figures

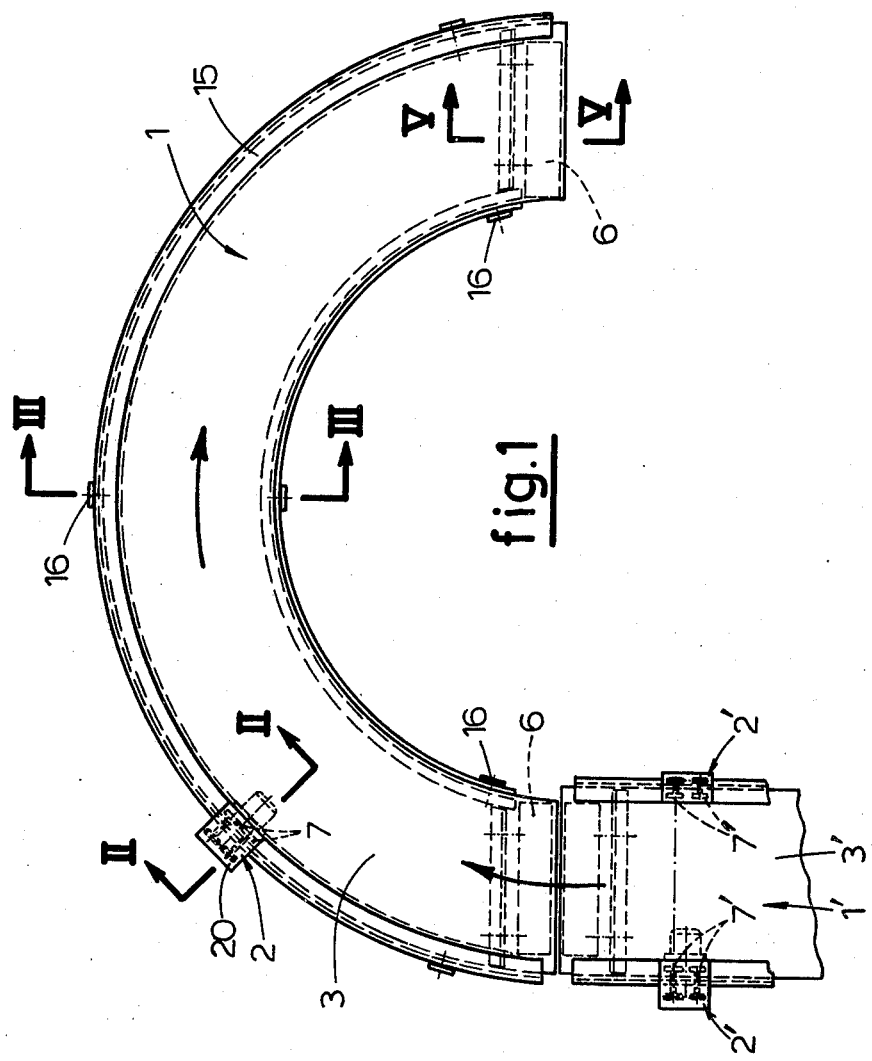

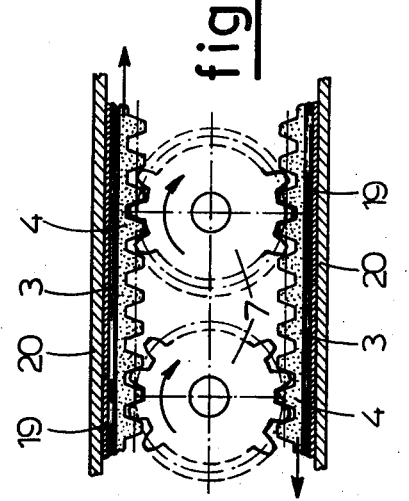
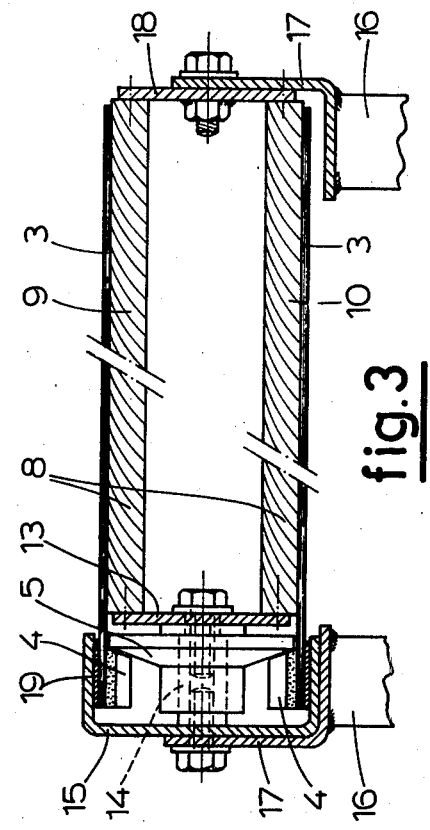
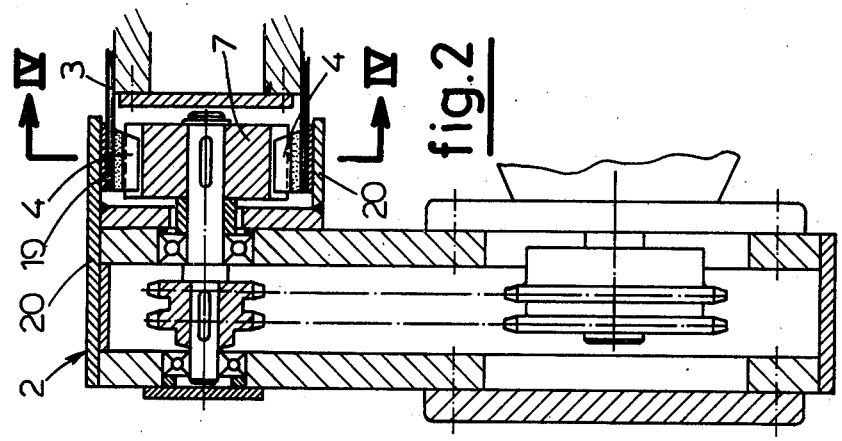

BELT CONVEYOR

BACKGROUND OF THE INVENTION

The invention relates to a belt conveyor, comprising an endless conveyor belt driven by a drive means and having an upper and a lower part, the conveyor belt being provided near at least one edge with detaining means which engage a guide means and which are locked by this guide means against displacement in the direction away from this guide means.

In a known embodiment of such a belt conveyor, adapted for transportation along a curve, with two conical end pulleys over which the endless conveyor belt is passed, the detaining means are constituted by a plurality of strips which are connected to the conveyor belt and which project beyond the outer edge thereof, each of these strips being provided with an opening through which a pin extends which is perpendicular to the adjacent belt portion. The strips are fastened to the conveyor belt by means of bolts and nuts. A stationary guideway is arranged on the outer side of the conveyor belt and comprises two plates which are substantially U-shaped in cross section, the legs of which face each other. The inner wall portions of the guideway formed in this manner are in engagement with the pins. The drive of the conveyor belt takes place by means of one of the two conical end pulleys.

SUMMARY OF THE INVENTION

It is an object of the present invention to provide a belt conveyor which is of a considerably simpler construction than the known belt conveyor.

To this end, the belt conveyor according to the invention is characterized in that the detaining means are in engagement with guide discs which are rotatably supported adjacent the conveyor belt and which form the guide means, while the drive means engage the detaining means and drive the conveyor belt through these detaining means.

Thus, according to the invention, the stationary guideway formed by the plates which are substantially U-shaped in cross section is eliminated, guide discs being used instead thereof. The detaining means also serve for driving the conveyor belt, so that they actually perform a double function.

According to the invention, a large measure of freedom regarding the location of the drive means is obtained. Further, it is possible to use more than one drive means if the belt load becomes very high.

This may be important, for example, in the case of belt conveyors which are adapted for transportation along a curve, when this curve is larger than approx. 120 degrees.

The invention may also be applied to a belt conveyor adapted for transportation along a linear path. The conveyor belt of this belt conveyor may be provided near both edges with detaining means which are in engagement with guide discs, which are rotatably supported on both sides of the conveyor belt, while the drive means engage the detaining means near both edges of the conveyor belt and drive this conveyor belt through these detaining means.

Since the conveyor belt of the belt conveyor according to the invention is no longer driven by means of a driven end pulley, as in the case of the known belt conveyor, the endless conveyor belt of the belt conveyor according to the invention can operate without high internal stresses and can even be relatively slack. This endless conveyor belt can then be guided along stationary end guide members during its passage from the upper part to the lower part and vice versa. These stationary end guide members can have a nonconical shape and may be cylindrical or rectangular in cross section, so that the upper and the lower part of the conveyor belt run parallel to each other.

Each of the guide discs may then engage the detaining means under the upper part as well as those on the lower part of the conveyor belt.

According to a favourable embodiment of the belt conveyor according to the invention, the detaining means near one edge or near both edges of the conveyor belt are constituted by an endless protrusion, provided on the face of the conveyor belt opposite to the bearing surface thereof and following the conveyor belt in its longitudinal direction. The form of the cross section of the protrusion may be trapezoidal, circular, semi-circular or rectangular.

In a very important embodiment of the belt conveyor according to the invention, the protrusion near at least one edge of the conveyor belt is an endless flexible rack, the drive means comprising at least one driven gear wheel which meshes with the teeth of the flexible rack.

The (each) flexible rack preferably meshes with at least two gear wheels driven by the drive means.

The driven gear wheel or gear wheels, respectively, may mesh both with the flexible rack under the upper part and with the flexible rack on the lower part of the conveyor belt when these belt parts are parallel to each other.

According to another embodiment of the belt conveyor according to the invention, at least one guide disc is coupled with the drive means and engages the cooperating protrusion.

According to a further embodiment of the conveyor belt according to the invention, the detaining means on one side or on both sides of the conveyor belt are constituted by perforations in the conveyor belt located near one edge or near the two edges of the conveyor belt, the guide discs being provided with teeth that are in mesh with these perforations.

BRIEF DESCRIPTION OF THE DRAWINGS

The invention will be explained hereinafter with reference to the drawings.

FIG. 1 is a top view of two co-operating belt conveyors according to the invention.

FIG. 2 is a section along the plane II—II in FIG. 1 on a larger scale.

FIG. 3 is a section along the plane III—III in FIG. 1 on a larger scale.

FIG. 4 is a section along the plane IV—IV in FIG. 2.

DESCRIPTION OF A PREFERRED EMBODIMENT

Figure 6:
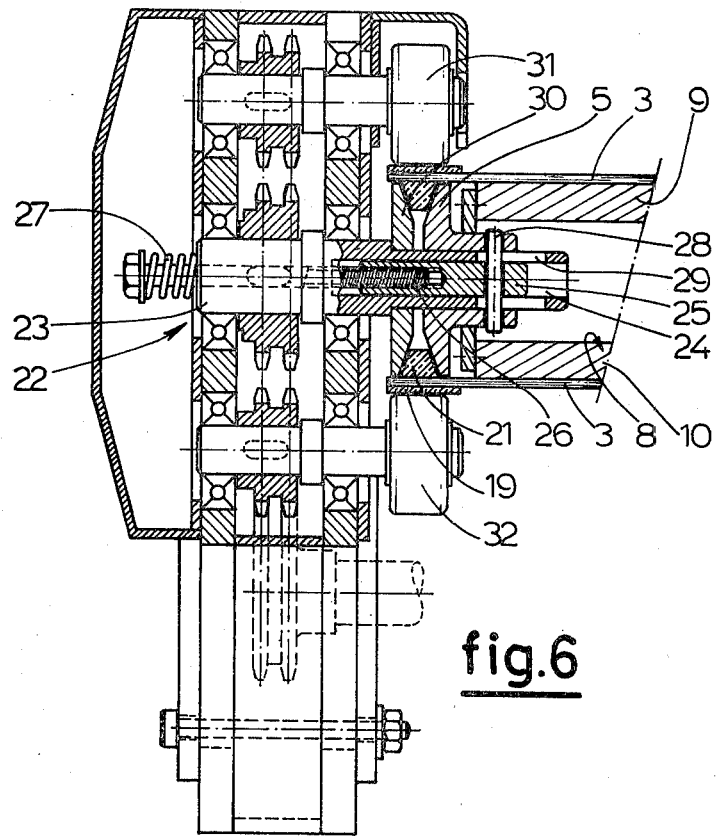
FIG. 6 is a section, corresponding to FIG. 2, of a belt conveyor of a modified construction.
Figure 5:
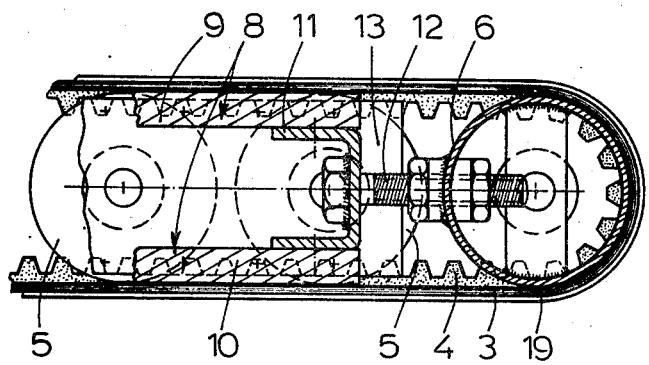
FIG. 5 is a section along the plane V—V in FIG. 1 on a larger scale.

FIG. 1 shows a first belt conveyor 1 according to the invention, adapted for transportation along a curve. This belt conveyor 1 is fed by a second belt conveyor 1' according to the invention, adapted for transportation along a linear path. The two belt conveyors 1 and 1' are each equipped with a drive means 2 and 2', respectively, which drive an endless conveyor belt 3 and 3', respectively, the conveyor belts 3, 3' each having an upper and a lower part.

In the following, a detailed description will first be given of the belt conveyor 1, whereupon the differences in design between the belt conveyors 1 and 1' will be explained.

The conveyor belt 3 of the belt conveyor 1 is provided near its outer edge with an endless protrusion, consisting of a flexible rack 4, which extends in the longitudinal direction of the conveyor belt 3 on the face of the conveyor belt 3 which is opposite to the bearing face thereof. This flexible rack 4, which is fastened on the conveyor belt 3 by means of a glued, sealed or mechanical bond or a combination of such bonds, and which is thus integral with this conveyor belt 3 engages the guide discs 5 rotatably supported near the outside of the conveyor belt 3 and constituting a guide means, the primary purpose of these guide discs being to lock the conveyor belt 3 against a radial, inwardly directed displacement.

The endless conveyor belt 3 is guided along stationary cylindrical end guide members 6 during its passage from the upper part to the lower part and vice versa. As a result, the upper and the lower part of the conveyor belt 3 are parallel to each other. Of course, the end guide members 6 may have a different design and may, for example, be rectangular in cross section.

The guide discs 5 are each in mesh both with the part of the flexible rack 4 under the upper part and with the part of the flexible rack 4 on the lower part of the conveyor belt 3.

The guide discs 5 are dish-shaped and each possess an outwardly directed conical surface, an upper and a lower part of which come into contact with the inwardly directed surface of the co-operating flexible rack 4 under the upper part and on the lower part of the conveyor belt 3.

The drive means 2 of the conveyor belt 3 comprise at least one driven gear wheel 7—and preferably, as shown in FIG. 4, two driven gear wheels 7—which is (are) in mesh with the teeth of the flexible rack 4 under the upper part as well as with the teeth of the flexible rack 4 on the lower part of the conveyor belt 3.

A stationary guide frame 8, to which the end guide members 6 are connected, is arranged between the upper part and the lower part of the conveyor belt 3. This stationary guide frame 8 comprises an upper supporting plate 9, extending under the upper part of the conveyor belt 3, and a lower plate 10, located above the lower part of the conveyor belt 3. A U-shaped supporting section 11 is fixed between the upper supporting plate 9 and the lower plate 10 at the ends located near the end guide members 6 and is adjustably connected by means of bolts 12 to the end guide member 6 located at the end involved.

The stationary guide frame 8 comprises on the outside an upright lateral bearing plate 13, which is fastened to the upper supporting plate 9 and to the lower plate 10 and on which the guide discs 5 are supported so as to be capable of free rotation (FIG. 3).

The guide discs 5 are rotatably mounted on bearing bushings 14 which are fixed on the outer side of the bearing plate 13 with the use of bolts. The guide discs 5 are locked against outward displacement by the flexible rack 4 only.

Each of the two end guide members 6 likewise supports a guide disc, which in a manner corresponding to that of the other guide discs 5 engages the flexible rack 4 on the conveyor belt 3.

A stationary U-shaped retaining section 15 extends along the greater part of the outer side of the conveyor belt 3 and embraces with an upper and a lower retaining flange the edge zone of the upper part and the edge zone of the lower part of the conveyor belt 3. The retaining section 15 is locally supported by legs 16 and brackets 17 which are fastened thereon. On the inner side, the stationary guide frame 8 is likewise supported by legs 16 and brackets 17 fastened thereon, use being made of an intermediate side plate 18. This side plate 18 is connected to the upper supporting plate 9 and to the lower plate 10 of the stationary guide frame 8.

In order to obtain a low friction, the conveyor belt 3 is furnished in the edge zone involved with a fabric or layer 19 of plastic or the like slidable material which comes into contact with the retaining flanges of the retaining section 15.

The retaining section 15 prevents the edge zone of the upper and the lower part of the conveyor belt 3 from deflecting, so that a satisfactory engagement between the guide discs 5 and the flexible rack 4 is ensured.

The retaining section 15 is interrupted in the area of the gear wheels 7. As FIG. 2 indicates, use is here made of intermediate plates 20 which take over the function of the retaining flanges of the retaining section 15.

The belt conveyor 1' for transportation along a linear path as shown in the drawing is equipped with a conveyor belt 3', which is provided on both sides with a flexible rack that is connected to this conveyor belt 3'. These flexible racks are in engagement with guide discs that are supported on both sides of the conveyor belt 3'. Furthermore, at least one gear wheel 7'—and preferably two gear wheels 7'—are meshed on both sides with the teeth of the flexible rack located on the side involved.

FIG. 6 shows the drive of a belt conveyor according to a modified embodiment of the invention. A non-toothed, endless protrusion 21 is here arranged near an edge of the conveyor belt 3 on the face of the conveyor belt 3 which is opposite to the bearing surface thereof. This protrusion 21 has a trapezoidal cross section and co-operates in the same manner as the flexible rack 4 with the guide discs 5, which lock the conveyor belt 3 against a radial, inwardly directed displacement.

In this embodiment, however, one of the guide discs 5 is coupled with the drive means 22, which consists of a motor-driven gearbox and reductor. This driven guide disc 5 drives the conveyor belt 3 by means of the trapezoidal protrusion 21.

The guide discs 5 are dish-shaped and each have an outwardly directed conical surface, an upper and a lower part of which come into contact with the inwardly directed surface of the co-operating protrusion 21 under the upper part and on the lower part of the conveyor belt 3.

As shown in FIG. 6, the drive shaft 23 of the driven guide disc 5 is provided with a cavity 24, in which a rod 25 is slidably accommodated. This rod 25 is loaded, through a bolt 26, by a spring 27, which applies a force to the rod 25 that is directed in FIG. 6 to the left. The rod 25 bears a transverse pin 28 which is slidable in slots 29 in the hollow drive shaft 23, but which follows a rotation of this shaft 23. The pin 28 itself is in driving engagement with the guide disc 5 involved. Accordingly, this driven guide disc 5, together with the transverse pin 28, is displaceable with respect to the drive shaft 23 and is pressed by the spring 27 against the trapezoidal protrusion 21.

A dish-shaped counter-disc 30, which is rotatably mounted on the drive shaft 23 is aligned with the driven guide disc 5 and bears against a shoulder on this drive shaft 23. This counter-disc 30 engages the intermediate trapezoidal protrusion 21 on the side remote from the driven guide disc 5.

Furthermore, at least one upper pressure roller 31 engages from the upper side the upper part of the conveyor belt 3 in the area of the edge zone provided with the protrusion 21. Similarly, at least one lower pressure roller 32 engages from the underside the lower part of the conveyor belt 3 in the area of the edge zone provided with the trapezoidal protrusion 21.

These pressure rollers 31, 32 are driven by the drive means 22 in the embodiment shown in FIG. 6. The axes of rotation of the upper pressure roller 31, the lower pressure roller 32 and the driven guide disc 5 extend in one plane, which is perpendicular to the upper and lower parts of the conveyor belt 3. The upper and lower pressure rollers 31, 32 rotate in a direction opposite to that of the intermediate driven guide disc 5 and produce together with this guide disc 5 and the counter-disc 30 an excellent drive of the conveyor belt 3. Of course, it is also possible to use several sets of pressure rollers 31, 32, and, as an alternative, they can also be arranged so as to be capable of free rotation. The retaining section 15 is interrupted in the area of the pressure rollers 31, 32.

The protrusion 21 of the embodiment shown in FIG. 6 is trapezoidal in cross section, but as an alternative it is also possible to use other cross-sectional shapes for this purpose, such as circular, semi-circular or rectangular.

The invention is not restricted to the examples shown in the drawings, which can be varied in various manners within the scope of the appended claims.

I claim:

1. A conveyor belt assembly comprising: an endless conveyor belt having an upper and a lower run, said conveyor belt being provided near at least one edge with an endless protrusion on the face of the conveyor belt opposite to the bearing surface thereof and following the conveyor belt in its longitudinal direction, said protrusion being in engagement with a plurality of guide discs which are rotatably supported adjacent the conveyor belt, at least one guide disc coupled with drive means through a drive shaft, said driven guide disc being displaceable in the transverse direction of the conveyor belt and pressing against the protrusion under the influence of a spring, counter-disc means being aligned with the driven guide disc and engaging the protrusion on a side remote from said guide disc, said counter-disc being mounted for free rotation on said drive shaft of the co-operating driven guide disc and bearing against a shoulder on said drive shaft, the endless conveyor belt being guided along stationary end guide members during its passage from the upper run to the lower run and vice versa.

2. A conveyor belt assembly according to claim 1, wherein: the end guide members are cylindrical in cross-section.

3. A conveyor belt assembly according to claim 1, wherein: the upper and the lower belt runs are parallel to each other, while the guide discs simultaneously engage the protrusion underneath the upper run and on the lower run of the conveyor belt.

4. A belt conveyor according to claim 1, wherein: a stationary guide frame is arranged between the upper run and the lower run of the conveyor belt, said stationary guide frame comprising an upper supporting plate, extending under the upper run of the conveyor belt, and a lower plate, located above the lower run of the conveyor belt, a support being fixed between the upper supporting plate and the lower plate at the respective ends near the end guide members and being adjustably connected by means of bolts to said respective guide member, said stationary guide frame being further defined by an upright lateral bearing plate fastened to at least one of said supporting plates and on which the guide discs are rotatably supported, at least one upper pressure roller disposed to act from the upper side the upper run of the conveyor belt in the area of the edge zone provided with the protrusion, at least one lower pressure roller engaging from the underside the lower run of the conveyor belt in the area of the edge zone provided with the protrusion, the axes of rotation of the upper pressure roller, of the lower pressure roller and of the driven guide disc extending in a plane substantially perpendicular to the upper and lower runs of the conveyor belt, and the upper and lower pressure rollers being coupled with the drive means driven in a direction opposite to that of the driven guide disc.

5. A conveyor belt assembly employing an endless conveyor belt having an upper and a lower run, wherein: said conveyor belt is provided near at least one edge, with an endless flexible rack on the face of the conveyor belt opposite to the bearing surface thereof and following the conveyor belt in its longitudinal direction, and drive means comprising at least one driven gear wheel meshing with the flexible rack, said flexible rack being guided by a plurality of guide discs that are rotatably supported adjacent the conveyor belt, said conveyor belt further being guided along stationary end guide members during its passage from the upper run to the lower run and vice versa, a stationary guide frame is arranged between the upper run and the lower run of the conveyor belt, said stationary guide frame comprising an upper supporting plate, extending under the upper run of the conveyor belt, and a lower plate disposed above the lower run of the conveyor belt, support means fixed between the upper supporting plate and the lower plate at the ends located near the end guide members and being adjustably connected to the end guide member located thereat, said stationary guide frame being further deferred by an upright lateral bearing plate fastened to at least one of said supporting plates and on which the guide discs are rotatably supported, a stationary U-shaped retaining section extending along at least the greater part of the conveyor belt on at least one side, and upper and lower retaining flange means respectively disposed at the edge zone of the upper run and the edge zone of the lower run of the conveyor belt.

6. A conveyor belt assembly according to claim 5, wherein: said end guide members are cylindrical in cross-section.

7. A conveyor belt assembly according to claim 5, wherein: the upper and lower belt runs are parallel to each other, and the guide discs simultaneously engage the flexible rack underneath the upper run and on the lower run of the conveyor belt.

8. A conveyor belt assembly according to claim 5, wherein: the upper and lower belt runs are parallel to each other, and the driven gear wheel meshes simultaneously with the flexible rack underneath the upper run and on the lower run of the conveyor belt.

* * * * *